(12) United States Patent
Yang

(10) Patent No.: US 12,048,038 B2
(45) Date of Patent: Jul. 23, 2024

(54) METHOD FOR REPORTING INFORMATION, METHOD FOR COORDINATING RESOURCE, AND MULTI-CARD TERMINAL

(71) Applicant: XIAOMI COMMUNICATIONS CO., LTD., Beijing (CN)

(72) Inventor: Xing Yang, Beijing (CN)

(73) Assignee: XIAOMI COMMUNICATIONS CO., LTD., Beijing (CN)

( * ) Notice: Subject to any disclaimer, the term of this patent is extended or adjusted under 35 U.S.C. 154(b) by 352 days.

(21) Appl. No.: 17/620,802

(22) PCT Filed: Jun. 25, 2019

(86) PCT No.: PCT/CN2019/092853
§ 371 (c)(1),
(2) Date: Dec. 20, 2021

(87) PCT Pub. No.: WO2020/258049
PCT Pub. Date: Dec. 30, 2020

(65) Prior Publication Data
US 2022/0369400 A1    Nov. 17, 2022

(51) Int. Cl.
*H04W 76/15* (2018.01)
*H04W 76/19* (2018.01)
*H04W 76/28* (2018.01)

(52) U.S. Cl.
CPC ........... *H04W 76/15* (2018.02); *H04W 76/19* (2018.02); *H04W 76/28* (2018.02)

(58) Field of Classification Search
None
See application file for complete search history.

(56) References Cited

U.S. PATENT DOCUMENTS

| 2013/0303203 | A1 | 11/2013 | Wang et al. |
| 2016/0219608 | A1* | 7/2016 | Awoniyi-Oteri ............................ H04W 72/1215 |
| 2016/0219648 | A1* | 7/2016 | Awoniyi-Oteri ........ H04W 8/24 |
| 2017/0048773 | A1* | 2/2017 | Miao .................... H04B 1/3816 |
| 2017/0359813 | A1* | 12/2017 | Lee .................... H04W 52/0212 |
| 2017/0367085 | A1* | 12/2017 | Chakraborty ..... H04W 36/0094 |
| 2018/0368099 | A1* | 12/2018 | Chen ..................... H04W 48/18 |

(Continued)

FOREIGN PATENT DOCUMENTS

| CN | 108650672 A | 10/2018 |
| WO | WO 2018141148 A1 | 8/2018 |

OTHER PUBLICATIONS

European Patent Application No. 19934962.2, Search and Opinion dated Jan. 9, 2023, 11 pages.

(Continued)

*Primary Examiner* — Otis L Thompson, Jr.
(74) *Attorney, Agent, or Firm* — Cozen O'Connor

(57) ABSTRACT

A method for reporting information, a method for coordinating resources, and a multi-card terminal. The method for reporting information includes: determining that access to a plurality of base stations is maintained simultaneously, the plurality of base stations belonging to different wireless network operators; reporting auxiliary information to the plurality of base stations, the auxiliary information being configured to coordinate resources between the plurality of base stations.

18 Claims, 6 Drawing Sheets receiving auxiliary information reported by a multi-SIM terminal — S201 coordinating resources for the multi-SIM terminal and a plurality of base stations accessed by the multi-SIM terminal based on the auxiliary information — S202

(56) References Cited

U.S. PATENT DOCUMENTS

| | | | | |
|---|---|---|---|---|
| 2020/0374785 | A1* | 11/2020 | Li | H04W 8/24 |
| 2020/0383152 | A1* | 12/2020 | Walia | H04W 76/12 |
| 2021/0127256 | A1* | 4/2021 | Li | H04W 60/005 |
| 2022/0240213 | A1* | 7/2022 | Ly | H04W 60/04 |
| 2024/0030995 | A1* | 1/2024 | Zhang | H04L 5/0051 |
| 2024/0032052 | A1* | 1/2024 | Babaei | H04W 72/23 |

OTHER PUBLICATIONS

PCT/CN2019/092853 International Search Report dated Mar. 24, 2020, 2 pages.

* cited by examiner

METHOD FOR REPORTING INFORMATION, METHOD FOR COORDINATING RESOURCE, AND MULTI-CARD TERMINAL

CROSS-REFERENCE TO RELATED APPLICATION

This application is a U.S. national phase of International Application No. PCT/CN2019/092853, filed with the State Intellectual Property Office of P. R. China on Jun. 25, 2019, the content of which is incorporated herein by reference in its entirety.

TECHNICAL FIELD

The disclosure relates to a field of communication technologies, and particularly to a method for reporting information, a method for coordinating resources, a multi-SIM terminal, a base station and a non-transitory computer-readable storage medium.

BACKGROUND

With the development of wireless communication technologies, more and more multi-SIM terminals have emerged. Each multi-SIM terminal may simultaneously maintain access to networks of a plurality of operators. However, there is no interface between networks of different operators.

It is an urgent problem to avoid data loss of the multi-SIM terminal.

SUMMARY

The disclosure provides a method and an apparatus for reporting information, a method and an apparatus for coordinating resources, a multi-SIM terminal, a base station and a non-transitory computer-readable storage medium.

According to a first aspect of the embodiments of the disclosure, a method for reporting information is provided. The method is applicable to a multi-SIM terminal, and includes: determining that access to a plurality of base stations is maintained simultaneously, the plurality of base stations belonging to different wireless network operators; and reporting auxiliary information to the plurality of base stations, the auxiliary information being configured to coordinate resources between the plurality of base stations.

According to a second aspect of the embodiments of the disclosure, a method for coordinating resources is provided. The method is applicable to a base station, and includes: receiving auxiliary information reported by a multi-SIM terminal; and coordinating resources for the multi-SIM terminal and a plurality of base stations accessed by the multi-SIM terminal based on the auxiliary information.

According to a third aspect of the embodiments of the disclosure, a multi-SIM terminal is provided, and includes: a processor; and a memory configured to store instructions executable by the processor; the processor is configured to: determine that access to a plurality of base stations is maintained simultaneously, the plurality of base stations belonging to different wireless network operators; and report auxiliary information to the plurality of base stations, the auxiliary information being configured to coordinate resources between the plurality of base stations.

According to a fourth aspect of the embodiments of the disclosure, a base station is provided, and includes: a processor; and a memory configured to store instructions executable by the processor; the processor is configured to: receive auxiliary information reported by a multi-SIM terminal; and coordinate resources for the multi-SIM terminal and a plurality of base stations accessed by the multi-SIM terminal based on the auxiliary information.

It should be understood that, the above general descriptions and latter detailed descriptions are only illustrative and descriptive, and may not be a limitation of the disclosure.

BRIEF DESCRIPTION OF THE DRAWINGS

The drawings herein are incorporated into the specification and constitute a part of the specification, show embodiments in conformity with embodiments of the present disclosure, and explain the principle of the present disclosure together with the specification.

DETAILED DESCRIPTION

The example embodiments will be described in detail here, and examples thereof are shown in the accompanying drawings. When the following descriptions refer to the accompanying drawings, unless otherwise indicated, the same numbers in different drawings represent the same or similar elements. The implementations described in the following example embodiments do not represent all the implementations consistent with the present invention. Rather, they are merely examples of the apparatus and method consistent with some aspects of the present invention as detailed in the appended claims.

When a downlink service arrives at a user equipment (UE) in an idle state or in a non-active state, the network may page the UE, and if the UE does not reply within a time period, the network considers that the UE cannot be connected and the service fails.

The network may configure discontinuous reception (DRX) for the UE, which includes a cycle and an active duration. The UE only needs to monitor a network downlink signal within the active duration of each cycle, and keeps in a sleep state within other durations during which the UE needs not to monitor the network downlink signal. The network also may configure a periodic semi-persistent schedule (SPS) uplink sending resource for the UE.

If the multi-SIM UE cannot support data transmissions with a plurality of networks simultaneously, when the resources scheduled by the plurality of networks overlap, the UE has to give up data transmissions with some networks, resulting in data loss.

Figure 1:
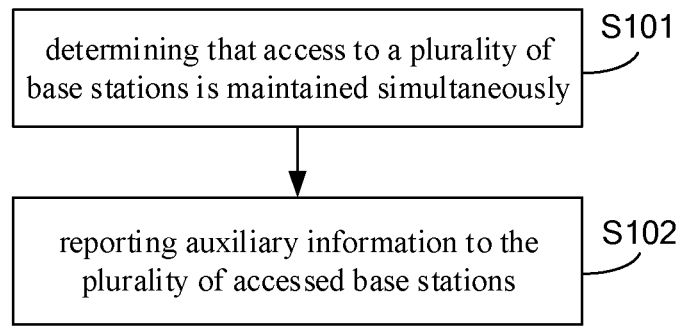
FIG. 1 is a flowchart illustrating a method for reporting information according to an embodiment.

FIG. 1 is a flowchart illustrating a method for reporting information according to an embodiment of the disclosure. The embodiment is described from a multi-SIM terminal side. As illustrated in FIG. 1, the method for reporting information includes the following.

At block S101, it is determined that access to a plurality of base stations is maintained simultaneously. The plurality of base stations belong to different wireless network operators.

For example, a multi-SIM terminal has access to a base station 1 and a base station 2 simultaneously. The base station 1 belongs to an operator A, and the base station 2 belongs to an operator B.

At block S102, auxiliary information is reported to the plurality of accessed base stations. The auxiliary information is configured to coordinate resources between the plurality of accessed base stations.

In the embodiment, the multi-SIM terminal may report the auxiliary information to each accessed base station, also, the multi-SIM terminal may report the auxiliary information to some base stations of the plurality of accessed base stations, which is not limited herein.

In the embodiment, the auxiliary information may include connection states of the multi-SIM terminal in a plurality of networks where the plurality of accessed base stations are located. The connection states of the multi-SIM terminal in the plurality of networks where the plurality of accessed base stations are located includes a connection state of the multi-SIM terminal in each network of a plurality of networks where other base stations in the plurality of accessed base stations are located. For example, when the multi-SIM terminal reports the auxiliary information to the first base station, the auxiliary information includes a connection state of each of other base stations in addition to the first base station.

In the embodiment, reporting the auxiliary information to the plurality of accessed base stations may include: in case that the multi-SIM terminal is in a connected state, an idle state or a non-active state in a network where an accessed base station is located, determining that the connection state of the multi-SIM terminal in the network is a connected state; in case that the multi-SIM terminal is in a state other than the connected state, the idle state or the non-active state in the network where the accessed base station is located, determining that the connection state of the multi-SIM terminal in the network is a non-connected state; and reporting the connection states of the multi-SIM terminal in plurality of networks to each of the plurality of base stations.

Alternatively, the auxiliary information also may include DRX configuration information of the multi-SIM terminal in a plurality of networks where other base stations are located, and the DRX configuration information includes a starting sub-frame, a time offset, a cycle and an active duration. The starting sub-frame is a sub-frame at the beginning of the DRX cycle which is mapped to a sub-frame of a network where a reported base station is located, and the time offset is a time offset between a frame edge of a network where another base station is located and a frame edge of a network where the reported base station is located. The DRX configuration information is configured to schedule a downlink data receiving resource by the base station.

Alternatively, the auxiliary information also may include SPS configuration information of the multi-SIM terminal in a plurality of networks where other base stations are located, and the SPS configuration information includes a starting sub-frame, a time offset, a cycle and a sending duration. The starting sub-frame is a sub-frame at the beginning of the SPS cycle which is mapped to a sub-frame of a network where a reported base station is located, and the time offset is a time offset between a frame edge of a network where another base station is located and a frame edge of a network where the reported base station is located. The SPS configuration information is configured to schedule an uplink data sending resource by the base station. In the embodiment, the auxiliary information may be carried in a radio resource control (RRC) connection setup complete message, an RRC connection setup resume message, an RRC connection reestablishment message, or a user equipment (UE) auxiliary information message, that is, the auxiliary information may be reported to the plurality of accessed base stations through the RRC connection setup complete message, the RRC connection setup resume message, the RRC connection reestablishment message, or the UE auxiliary information message.

Alternatively, the method may further include: in response to detecting that the auxiliary information changes, reporting updated auxiliary information, so that the base station may coordinate resources based on the updated auxiliary information.

In the above embodiment, when access to a plurality of base stations that belong to different wireless network operators is maintained simultaneously, the auxiliary information is reported to the plurality of accessed base stations, so as to coordinate resources between the base stations, thereby avoiding data loss of the multi-SIM terminal.

Figure 2:
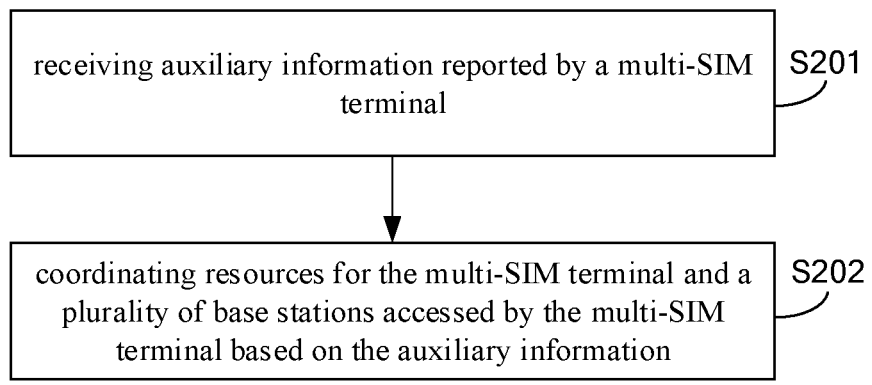
FIG. 2 is a flowchart illustrating a method for coordinating resources according to an embodiment.

FIG. 2 is a flowchart illustrating a method for coordinating resources according to an embodiment of the disclosure. The embodiment is described from a base station side. As illustrated in FIG. 2, the method for coordinating resources includes the following.

At block S201, auxiliary information reported by a multi-SIM terminal is received.

At block S202, resources are coordinated for the multi-SIM terminal and a plurality of base stations accessed by the multi-SIM terminal based on the auxiliary information.

In case that the auxiliary information includes connection states of the multi-SIM terminal in a plurality of networks where the plurality of accessed base stations are located, coordinating the resources for the multi-SIM terminal and the plurality of base stations accessed by the multi-SIM terminal based on the auxiliary information may include: in response to the connection state is a connected state, increasing a paging response duration and waiting for a paging response of the multi-SIM terminal based on the increased paging response duration; and also may include: in response to the connection state is a connected state, increasing a paging times and paging the multi-SIM terminal based on the increased paging times. In this way, data loss of the multi-SIM terminal may be reduced.

Alternatively, in case that the auxiliary information includes discontinuous reception (DRX) configuration information of the multi-SIM terminal in a plurality of network where other base stations in the plurality of base stations are located and the DRX configuration information includes a starting sub-frame, a time offset, a cycle and an active duration, coordinating the resources for the multi-SIM terminal and the plurality of base stations accessed by the multi-SIM terminal based on the auxiliary information may include: determining a time period for scheduling a downlink data receiving resource by each of the other base stations within each cycle based on the starting sub-frame, the active duration and the time offset, and scheduling the downlink data receiving resource for the multi-SIM terminal within a time period other than the time period for scheduling the downlink data receiving resource by each of the other base stations.

For example, the auxiliary information reported by the multi-SIM terminal is DRX configuration information, and the DRX configuration information may be described as follows: the starting sub-frame is 2, the time offset is +0.1 ms, the cycle is 20 ms, and the active duration is 2 ms, in this case, the time period for scheduling the downlink data receiving resource by the other base station obtained by the base station based on the auxiliary information is: a time period starting from sub-frame 2+0.1, a time period starting from sub-frame 3+0.1 and a time period starting from sub-frame 4+0.1 in each cycle, and the base station schedules the downlink data receiving resource in a time period other than the time period, thereby avoiding data loss of the multi-SIM terminal.

Alternatively, in case that the auxiliary information includes SPS configuration information of the multi-SIM terminal in a plurality of networks where the other base stations are located and the SPS configuration information includes a starting sub-frame, a time offset, a cycle and a sending duration, coordinating the resources for the multi-SIM terminal and the plurality of base stations accessed by the multi-SIM terminal based on the auxiliary information may include: determining a time period for scheduling an uplink data sending resource by each of other base stations within each cycle based on the starting sub-frame, the sending duration and the time offset, and scheduling the uplink data sending resource for the multi-SIM terminal within a time period other than the time period for scheduling the uplink data sending resource by each of the other base stations, thereby avoiding data loss of the multi-SIM terminal.

In the embodiment, the auxiliary information reported by the multi-SIM terminal is received, and resources are coordinated for the multi-SIM terminal and the base stations accessed by the multi-SIM terminal based on the auxiliary information, so as to avoid data loss of the multi-SIM terminal.

Figure 3:
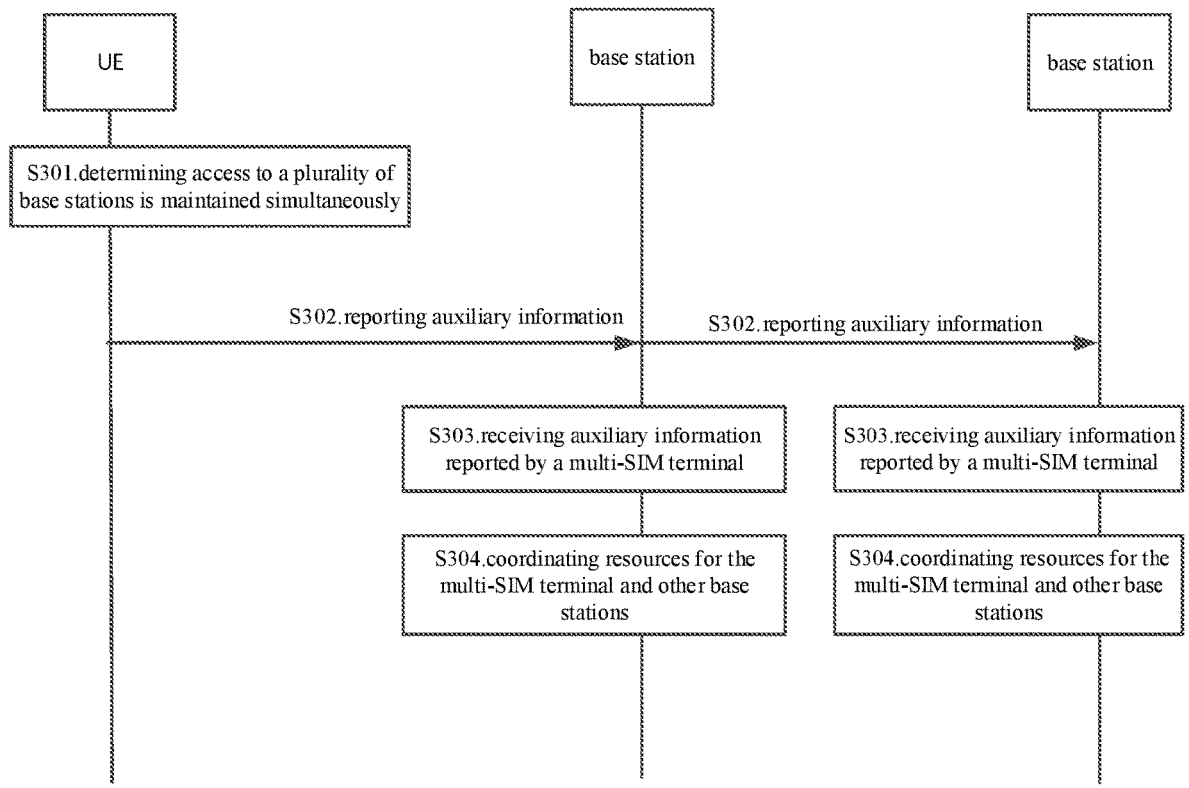
FIG. 3 is a flowchart illustrating a signaling of a method for coordinating resources according to an embodiment.

FIG. 3 is a flowchart illustrating a signaling of a method for coordinating resources according to an embodiment. The embodiment is described from the perspective of interaction between a base station and a multi-SIM terminal. As illustrated in FIG. 3, the method for coordinating resources includes the following.

At block S301, the multi-SIM terminal determines that access to a plurality of base stations is maintained simultaneously. The plurality of base stations belong to different wireless network operators.

At block S302, the multi-SIM terminal reports auxiliary information to the each accessed base station, and the auxiliary information is configured to coordinate resources between the base stations.

At block S303, the base station receives the auxiliary information reported by the multi-SIM terminal.

At block S304, the base station coordinates resources for the multi-SIM terminal and the base stations accessed by the multi-SIM terminal based on the auxiliary information.

In the above embodiment, the base station interacts with the multi-SIM terminal, so that the base station may receive the auxiliary information reported by the multi-SIM terminal, and coordinate resources for the multi-SIM terminal and the base stations accessed by the multi-SIM terminal based on the auxiliary information, so as to avoid data loss of the multi-SIM terminal.

Figure 4:
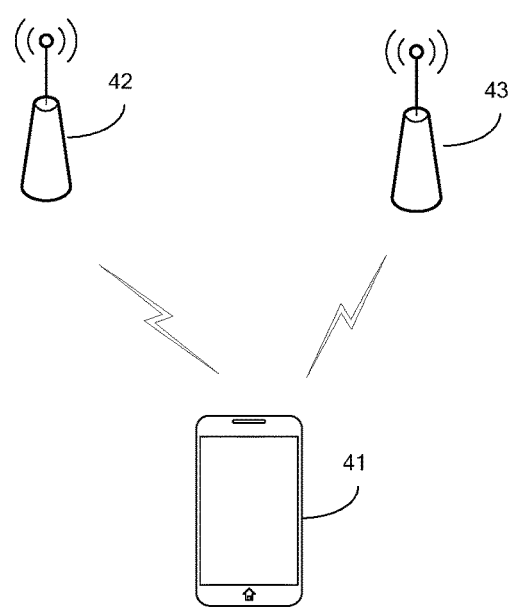
FIG. 4 is a schematic diagram illustrating a scenario of a method for coordinating resources according to an embodiment.

A process of coordinating resources in the disclosure is described below in combination with FIG. 4. As illustrated in FIG. 4, a UE 41 is equipped with both a SIM card 1 of an operator A and a SIM card 2 of an operator B, the SIM card 1 is in a connected state in a network A where a base station 42 is located, the SIM card 2 is in an idle state in a network B where a base station 43 is located, and a time offset between the two networks is 0.5 ms. DRX configured by the network A for the UE 41 can be described as follows: the cycle is 5 ms, the active duration is 1 ms, and the starting sub-frame is 5. When the UE establishes a connection in the network B, DRX configuration information of the network A is carried in an RRC connection setup complete message, and the DRX configuration information indicates that: the cycle is 5 ms, the active duration is 1 ms, and the starting sub-frame is 7. and a time offset is 0.5 ms. After receiving the DRX configuration information of the network A, the base station 43 determines a time period for scheduling a downlink data receiving resource by the base station 42, and schedules the downlink data receiving resource for the UE 41 in a time period other than the time period for scheduling the downlink data receiving resource by the base station 42, and the UE 41 may receive downlink data on the downlink data receiving resource scheduled by the base station 42 in the network B, thereby avoiding data loss. Then, when the UE 41 moves out of the coverage of the network A, the UE 41 sends a UE auxiliary information message to the network B carrying a connection state of the UE 41 in the network A which is a non-connected state, and after the base station 43 receives the auxiliary information message of the UE 41, the base station 43 obtains the connection state of the UE 41 in the network A which is a non-connected state, and on basis of this the base station 43 schedules a downlink data receiving resource for the UE 41.

Figure 5:
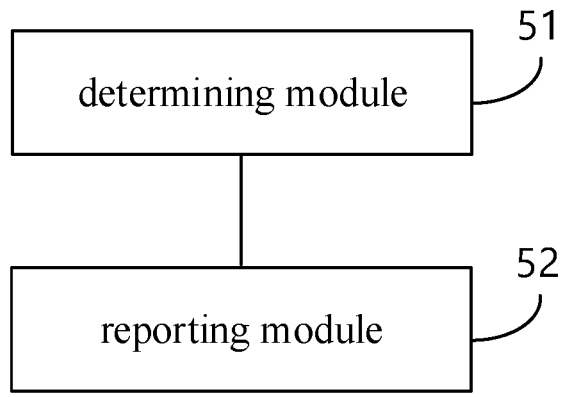
FIG. 5 is a block diagram illustrating an apparatus for reporting information according to an embodiment.

FIG. 5 is a block diagram illustrating an apparatus for reporting information according to an embodiment. The apparatus is located at a multi-SIM terminal. As illustrated in FIG. 5, the apparatus includes a determining module 51 and a reporting module 522.

The determining module 51 is configured to determine that access to a plurality of base stations is maintained simultaneously, the plurality of base stations belonging to different wireless network operators.

The reporting module 52 is configured to report auxiliary information to the plurality of accessed base stations after the determining module 51 determines that access to the plurality of base stations is maintained simultaneously, the auxiliary information being configured to coordinate resources between the plurality of accessed base stations.

In the embodiment, the reporting module may report the auxiliary information to each accessed base station, and also may report the auxiliary information to some of the plurality of accessed base stations.

In the embodiment, the auxiliary information may include connection states of the multi-SIM terminal in a plurality of networks where the plurality of accessed base stations are located. The connection states of the multi-SIM terminal in the plurality of networks where the plurality of accessed base stations are located include a connection state of the multi-SIM terminal in each network of a plurality of networks where other base stations in the plurality of accessed base stations are located. For example, when the reporting module reports the auxiliary information to a first base station, the auxiliary information includes connection states of other base stations in addition to the first base station.

In the embodiment, reporting the auxiliary information to the plurality of accessed base stations may include: in case that the multi-SIM terminal is in a connected state, an idle state or an non-active state in a network where an accessed base station is located, determining that the connection state of the multi-SIM terminal in the network is a connected state; in case that the multi-SIM terminal is in a state other than the connected state, the idle state or the non-active state in the network where the accessed base station is located, determining that the connection state of the multi-SIM terminal in the network is a non-connected state; and reporting connection states of the multi-SIM terminal in the plurality of networks where the plurality of accessed base stations are located to each base station.

Alternatively, the auxiliary information also may include DRX configuration information of the multi-SIM terminal in a plurality of networks where other base stations are located, and the DRX configuration information includes a starting sub-frame, a time offset, a cycle and an active duration. The starting sub-frame is a sub-frame at the beginning of the DRX cycle which is mapped to a sub-frame of a network where a reported base station is located, and the time offset is a time offset between a frame edge of a network where another base station is located and a frame edge of a network where the reported base station is located.

Alternatively, the auxiliary information also may include SPS configuration information of the multi-SIM terminal in a plurality of networks where other base stations are located, and the SPS configuration information includes a starting sub-frame, a time offset, a cycle and a sending duration. The starting sub-frame is a sub-frame at the beginning of the SPS cycle which is mapped to a sub-frame of a network where a reported base station is located, and the time offset is a time offset between a frame edge of a network where another base station is located and a frame edge of a network where the reported base station is located.

In the embodiment, the auxiliary information may be carried in a radio resource control (RRC) connection setup complete message, an RRC connection setup resume message, an RRC connection reestablishment message, or a user equipment (UE) auxiliary information message, that is, the auxiliary information may be reported to the plurality of accessed base stations through the RRC connection setup complete message, the RRC connection setup resume message, the RRC connection reestablishment message, or the UE auxiliary information message.

Alternatively, the method may further include: in response to detecting that the auxiliary information changes, reporting updated auxiliary information, so that the base station may coordinate resources based on the updated auxiliary information.

In the above embodiment, when access to a plurality of base stations that belong to different wireless network operators is maintained simultaneously, the auxiliary information is reported to the plurality of accessed base stations, so as to coordinate resources between the base stations, thereby avoiding data loss of the multi-SIM terminal.

Figure 6:
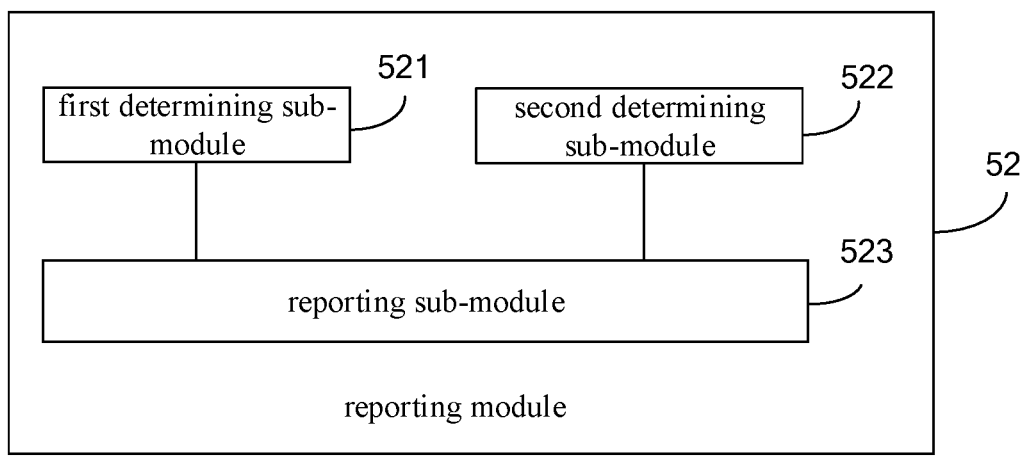
FIG. 6 is a block diagram illustrating another apparatus for reporting information according to an embodiment.

FIG. 6 is a block diagram illustrating another apparatus for reporting information according to an embodiment. As illustrated in FIG. 6, on the basis of the embodiment as illustrated in FIG. 5, when the auxiliary information includes connection states of the multi-SIM terminal in a plurality of networks where the plurality of accessed base stations are located, the reporting module 52 may include a first determining sub-module 521, a second determining sub-module 522 and a reporting sub-module 523.

The first determining sub-module 521 is configured to determine that the connection state of the multi-SIM terminal in a network where an accessed base station is located is a connected state in case that the multi-SIM terminal is in a connected state, an idle state or a non-active state in the network.

The second determining sub-module 522 is configured to determine that the connection state of the multi-SIM terminal in the network where the accessed base station is located is a non-connected state in case that the multi-SIM terminal is in a state other than any of the connected state, the idle state and the non-active state in the network.

The reporting sub-module 523 is configured to report connection states of the multi-SIM terminal in the plurality of networks where the plurality of accessed base stations are located determined by the first determining sub-module 521 or the second determining sub-module 522 to the plurality of accessed base stations.

In the above embodiment, the connection states of the multi-SIM terminal in the plurality of networks where the plurality of accessed base stations are located are reported to the plurality of accessed base stations, so that the base station may coordinate resources based on the connection states of the multi-SIM terminal in the plurality of networks where the plurality of accessed base stations are located and the base stations accessed by the multi-SIM terminal, thereby avoiding data loss of the multi-SIM terminal.

Figure 7:
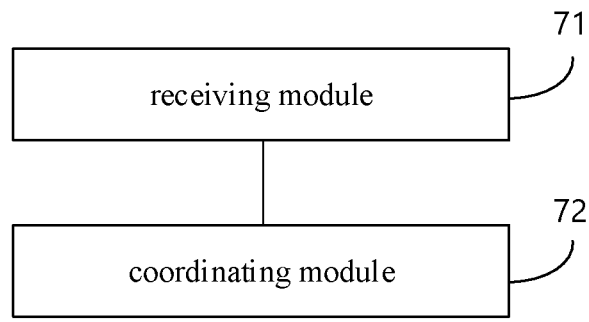
FIG. 7 is a block diagram illustrating an apparatus for coordinating resources according to an embodiment.

FIG. 7 is a block diagram illustrating an apparatus for coordinating resources according to an embodiment. The apparatus is located in a base station. As illustrated in FIG. 7, the apparatus includes a receiving module 71 and a coordinating module 72.

The receiving module 71 is configured to receive auxiliary information reported by a multi-SIM terminal.

The coordinating module 72 is configured to coordinate resources for the multi-SIM terminal and a plurality of base stations accessed by the multi-SIM terminal based on the auxiliary information received by the receiving module 71.

In the embodiment, the auxiliary information reported by the multi-SIM terminal is received, and resources are coordinated for the multi-SIM terminal and the base stations accessed by the multi-SIM terminal based on the auxiliary information, so as to avoid data loss of the multi-SIM terminal.

Figure 8:
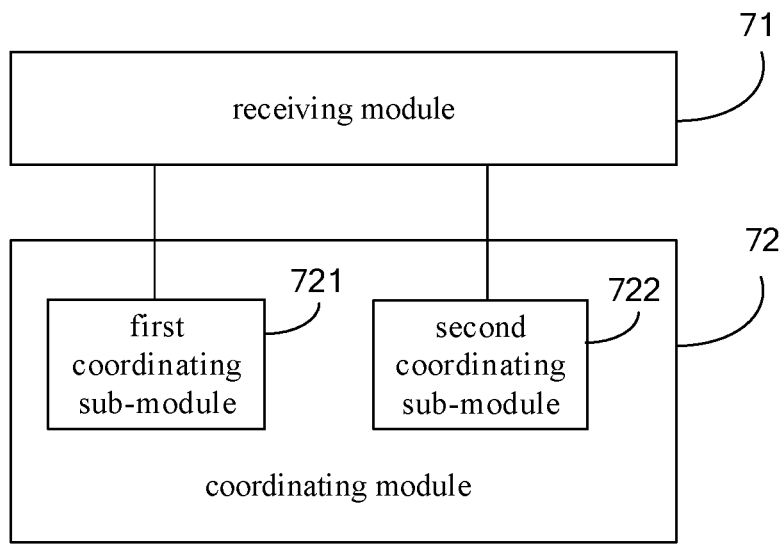
FIG. 8 is a block diagram illustrating another apparatus for coordinating resources according to an embodiment.

FIG. 8 is a block diagram illustrating another apparatus for coordinating resources according to an embodiment. As illustrated in FIG. 8, on the basis of the embodiment as illustrated in FIG. 7, when the auxiliary information includes connection states of the multi-SIM terminal in a plurality of networks where the plurality of accessed base stations are located, the coordinating module 72 may include a first coordinating sub-module 721 or a second coordinating sub-module 722.

The first coordinating sub-module 721 is configured to increase a paging response duration and wait for a paging response of the multi-SIM terminal based on the increased paging response duration in response to the connection state is a connected state.

The second coordinating sub-module 722 is configured to increase a paging times and page the multi-SIM terminal based on the increased paging times in response to the connection state is a connected state.

In the above embodiment, when the connection state of the multi-SIM terminal in a network where the accessed base station is located is connected, a paging response duration is increased and a paging response of the multi-SIM terminal is waited based on the increased paging response duration, or, a paging times is increased and the multi-SIM terminal is paged based on the increased paging times, so as to reduce data loss of the multi-SIM terminal.

Figure 9:
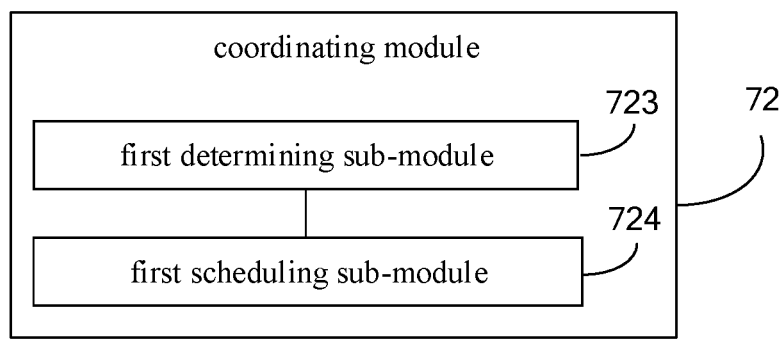
FIG. 9 is a block diagram illustrating another apparatus for coordinating resources according to an embodiment.

FIG. 9 is a block diagram illustrating another apparatus for coordinating resources according to an embodiment. As illustrated in FIG. 9, on the basis of the embodiment as illustrated in FIG. 7, when the auxiliary information includes discontinuous reception (DRX) configuration information of the multi-SIM terminal in a plurality of networks where other base stations are located, and the DRX configuration information includes a starting sub-frame, a time offset, a cycle and an active duration, the coordinating module 72 may include: a first determining sub-module 723 and a first scheduling sub-module 724.

The first determining sub-module 723 is configured to determine a time period for scheduling a downlink data receiving resource by each of the other base stations within each cycle based on the starting sub-frame, the active duration and the time offset.

The first scheduling sub-module 724 is configured to schedule the downlink data receiving resource for the multi-SIM terminal within a time period other than the time period for scheduling the downlink data receiving resource by each of the other base stations determined by the first determining sub-module 723.

For example, the auxiliary information reported by the multi-SIM terminal is the DRX configuration information, and the DRX configuration information can be described as follows: the starting sub-frame is 2, the time offset is +0.1 ms, the cycle is 20 ms, and the active duration is 2 ms, in this case, the time period for scheduling the downlink data receiving resource by the other base station obtained by the base station based on the auxiliary information is a time period starting from sub-frame 2+0.1, a time period starting from sub-frame 3+0.1 and a time period starting from sub-frame 4+0.1 within each cycle, and the base station schedules the downlink data receiving resource within the time period other than the time period, thereby avoiding data loss of the multi-SIM terminal.

In the above embodiment, the downlink data receiving resource is scheduled for the multi-SIM terminal in the time period other than the time period for scheduling the downlink data receiving resource by each of the other base stations, thereby avoiding data loss of the multi-SIM terminal.

Figure 10:
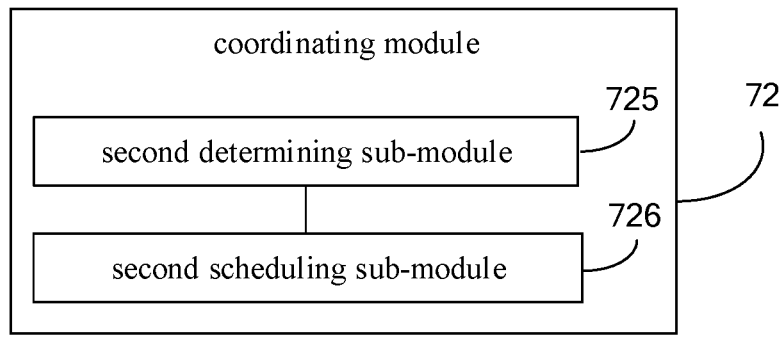
FIG. 10 is a block diagram illustrating another apparatus for coordinating resources according to an embodiment.

FIG. 10 is a block diagram illustrating another apparatus for coordinating resources according to an embodiment. As illustrated in FIG. 10, on the basis of the embodiment as illustrated in FIG. 7, when the auxiliary information includes semi-persistent schedule (SPS) configuration information of the multi-SIM terminal in a plurality of network where other base stations are located, and the SPS configuration information includes a starting sub-frame, a time offset, a cycle and a sending duration, the coordinating module 72 may include a second determining sub-module 725 and a second scheduling sub-module 726.

The second determining sub-module 725 is configured to determine a time period for scheduling an uplink data sending resource by each of the other base stations within each cycle based on the starting sub-frame, the sending duration and the time offset.

The second scheduling sub-module 726 is configured to schedule the uplink data sending resource for the multi-SIM terminal in a time period other than the time period for scheduling the uplink data sending resource by each of the other base stations determined by the second determining sub-module 725.

In the above embodiment, the uplink data sending resource is scheduled for the multi-SIM terminal in the time period other than the time period for scheduling the uplink data sending resources by each of the other base stations, thereby avoiding data loss of the multi-SIM terminal.

Figure 11:
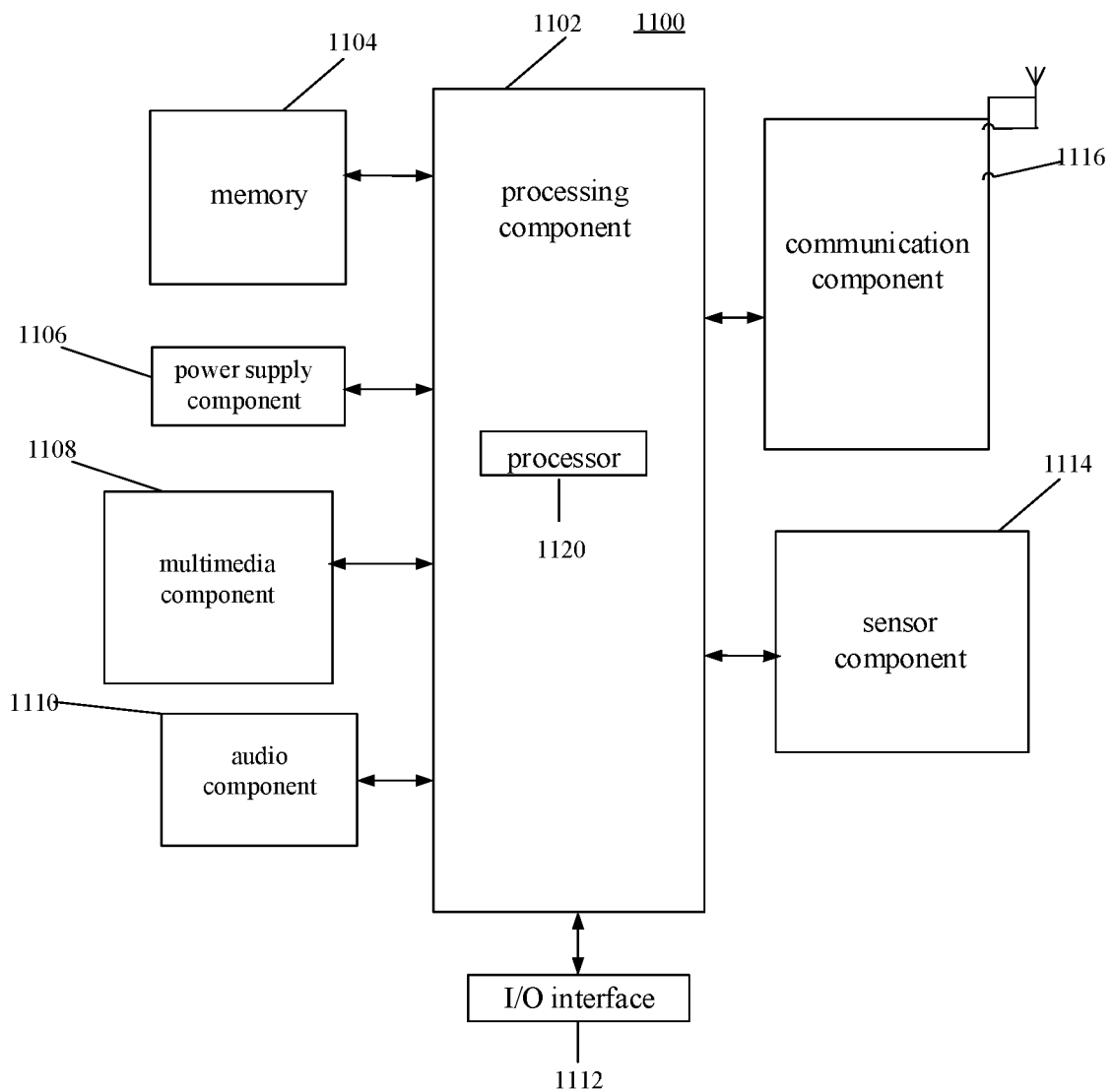
FIG. 11 is a block diagram illustrating an apparatus suitable for reporting information according to an embodiment.

FIG. 11 is a block diagram illustrating an apparatus suitable for reporting information according to an embodiment. For example, the apparatus 1100 may be a user equipment such as a mobile phone, a computer, a digital broadcasting terminal, a messaging device, a game console, a tablet device, a medical equipment, a fitness equipment, a personal digital assistant.

Referring to FIG. 11, the apparatus 1100 may include one or more components of the followings: a processing component 1102, a memory 1104, a power supply component 1106, a multimedia component 1108, an audio component 1110, an input/output (I/O) interface 1112, a sensor component 1114, and a communication component 1116.

The processing component 1102 generally controls the whole operation of the apparatus 1100, such as the operations related to display, phone call, data communication, camera operation and recording operation. The processing component 1102 may include one or more processors 1120 to perform instructions, to complete all or part of blocks of the above method. In addition, the processing component 1102 may include one or more modules for the convenience of interaction between the processing component 1102 and other components. For example, the processing component 1102 may include a multimedia module for the convenience of interaction between the multimedia component 1108 and the processing component 1102.

One processor 1120 in the processing component 1102 is configured to: determine that access to a plurality of base stations is maintained simultaneously, the plurality of base stations belonging to different wireless network operators; and report auxiliary information to the plurality of base stations, the auxiliary information being configured to coordinate resources between the plurality of base stations.

The memory 1104 is configured to store all types of data to support the operation of the apparatus 1100. Examples of the data include the instructions of any applications or methods operated on the apparatus 1100, contact data, phone book data, messages, pictures, videos, etc. The memory 1104 may be implemented by any type of temporary or non-temporary storage devices or their combination, such as a static random access memory (SRAM), an electrically erasable programmable read-only memory (EEPROM), an electrically programmable read-only memory (EPROM), a programmable read-only memory (PROM), a read-only memory (ROM), a magnetic memory, a flash memory, a magnetic disk or an optical disk.

The power supply component 1106 may provide power for all components of the apparatus 1100. The power supply component 1106 may include a power supply management system, one or more power supplies, and other units related to generating, managing and distributing power for the apparatus 1100.

The multimedia component 1108 includes an output interface screen provided between the apparatus 1100 and the user. In some embodiments, a screen may include a liquid crystal display (LCD) and a touch panel (TP). When the screen includes a TP, the screen may be implemented as a touch screen to receive an input signal from the user. The touch panel includes one or more touch sensors to sense touching, sliding and gestures on the touch panel. The touch sensor may not only sense the boundary of a touch or slide action, but also detect the duration and pressure related to the touch or slide operation. In some embodiments, the multimedia component 1108 includes a front camera and/or a rear camera. When the apparatus 1100 is in an operation mode, such as a shooting mode or a video mode, the front camera or the rear camera may receive the external multimedia data. Each front camera and rear camera may be a fixed optical lens system or an optical lens system with a focal length and an optical zoom capacity.

The audio component 1110 is configured to output and/or input an audio signal. For example, the audio component 1110 includes a microphone (MIC). When the apparatus 1100 is in an operation mode, such as a call mode, a record mode, and a speech recognition mode, the microphone is configured to receive the external audio signal. The received audio signal may be further stored in the memory 1104 or sent via the communication component 1116. In some embodiments, the audio component 1110 further includes a speaker configured to output an audio signal.

The I/O interface 1112 provides an interface for the processing component 1102 and the peripheral interface module, and the peripheral interface module may be a keyboard, a click wheel, a button, etc. The button may include but not limited to a home button, a volume button, a start button and a lock button.

The sensor component 1114 includes one or more sensors, configured to provide various aspects of status assessment for the apparatus 1100. For example, the sensor component 1114 may detect the on/off state of the apparatus 1100 and the relative positioning of the component. For example, the component is a display and a keypad of the apparatus 1100. The sensor component 1114 may further detect the location change of the apparatus 1100 or one component of the apparatus 1100, the presence or absence of contact between the user and the apparatus 1100, the orientation or acceleration/deceleration of the apparatus 1100, and the temperature change of the apparatus 1100. The sensor component 1114 may include a proximity sensor configured to detect the existence of the objects nearby without any physical contact. The sensor component 1114 may further include a light sensor such as CMOS or CCD image sensor, which is configured to use in imaging applications. In some embodiments, the sensor component 1114 may further include an acceleration transducer, a gyroscope sensor, a magnetic sensor, a pressure sensor or a temperature sensor.

The communication component 1116 is configured for the convenience of wire or wireless communication between the apparatus 1100 and other devices. The apparatus 1100 may access wireless networks based on communication standard, such as WiFi, 2G or 3G, or their combination. In an embodiment, the communication component 1116 receives broadcast signals or broadcast-related information from an external broadcast management system via a broadcast channel. In an embodiment, the communication component 1116 further includes a near field communication (NFC) module to facilitate short-range communication. For example, the NFC module may be achieved based on an RFID technology, an IrDA technology, a UWB technology, a BT technology and other technologies.

In an embodiment, the apparatus 1100 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform the above methods.

In an embodiment, a non-transitory computer-readable storage medium is further provided which includes instructions, such as the memory 1104 including instructions, the instructions may be executed by the processor 1120 of the apparatus 1100 to complete the above methods. For example, the non-transitory computer-readable storage medium may be a ROM, a random access memory (RAM), a CD-ROM, a magnetic tape, a floppy disk, an optical data storage device, etc.

Figure 12:
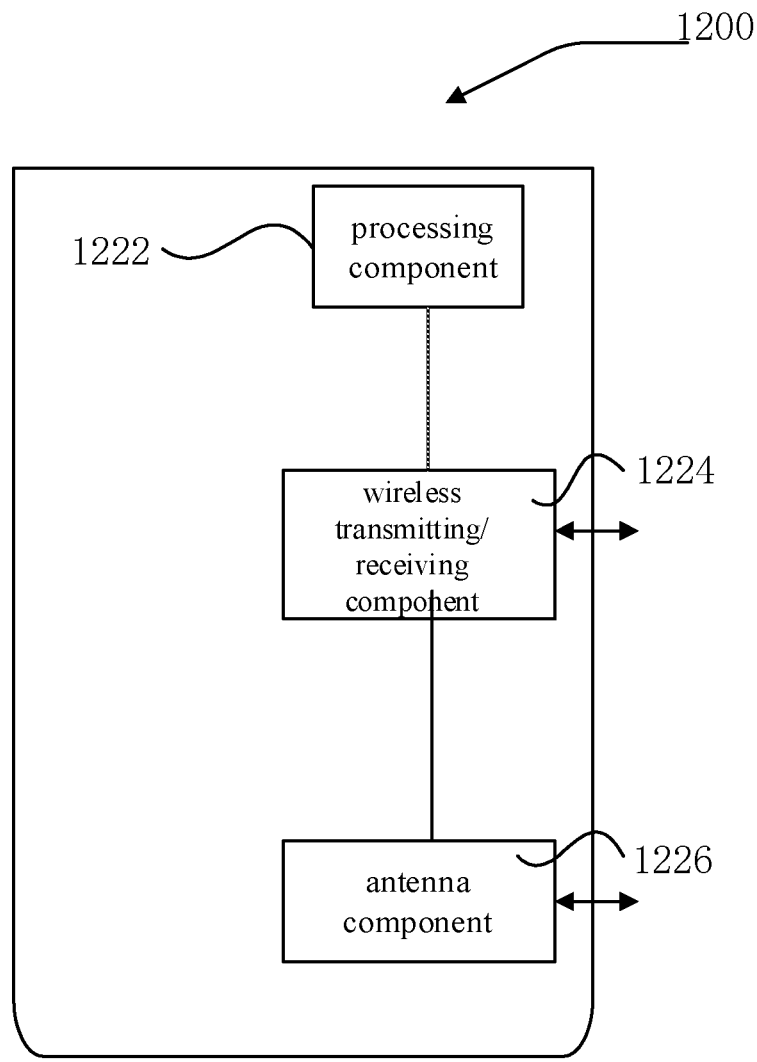
FIG. 12 is a block diagram illustrating an apparatus suitable for coordinating resources according to an embodiment.

FIG. 12 is a block diagram illustrating an apparatus suitable for coordinating resources according to an embodiment. The apparatus 1200 may be provided as a base station. As illustrated in FIG. 12, the apparatus 1200 includes a processing component 1222, a wireless transmitting/receiving component 1224, an antenna component 1226 and a signal processing part peculiar to a wireless interface. The processing component 1222 may further include one or more processors.

One processor in the processing component 1222 is configured to: receive auxiliary information reported by a multi-SIM terminal; and coordinate resources for the multi-SIM terminal and a plurality of base stations accessed by the multi-SIM terminal based on the auxiliary information.

In an embodiment, a non-transitory computer-readable storage medium is further provided which includes an instruction, the instruction may be executed by the processor 1222 of the apparatus 1200 to complete the above method for coordinating resources. For example, the non-transitory computer-readable storage medium may be a ROM, a random access memory (RAM), a CD-ROM, a magnetic tape, a floppy disk, an optical data storage device, etc.

Since the apparatus embodiments basically correspond to the method embodiments, please refer to part of descriptions of the method embodiments for relevant information. The above apparatus embodiments are merely schematic, the units described as separate components may or may not be physically separated, and components displayed as units may or may not be physical units, that is, may be located in one place, or may be distributed on a plurality of network units. Some or all of the modules may be selected according to actual requirements to achieve the solutions in the embodiments. Those skilled in the art may understand and implement the method without any creative effort.

It should be noted that relational terms such as first and second are used herein to distinguish one entity or operation from another without necessarily requiring or implying any such actual relationship or sequence between the entities or operations. The terms "comprising", "comprise" or any other variations are intended to cover a non-exclusive inclusion, such that a process, a method, an article, or a device that includes a series of elements not only includes the elements, but also includes other elements not expressly listed, or elements inherent to such a process, a method, an article, or a device. In the absence of more restrictions, the elements defined by a sentence "comprising one" do not exclude the presence of additional identical elements in a process, a method, an article, or a device that includes the elements.

After considering the specification and practicing the disclosure herein, those skilled in the art will easily think of other embodiments of the present application. The present application is intended to cover any variations, usages, or adaptive changes of the present disclosure. These variations, usages, or adaptive changes follow the general principles of the present disclosure and include common knowledge or conventional technical means in the technical field not disclosed by the present disclosure. The specification and embodiments are only illustrative, and the true scope and spirit of the disclosure are indicated by the following claims.

It should be understood that the present disclosure is not limited to the precise structure described above and shown in the drawings, and various modifications and changes may be made without departing from its scope. The scope of the present application is only limited by the appended claims.

What is claimed is:

1. A method for reporting information, the method comprising:
   determining, by a multi-Subscriber Identity Module (SIM) terminal, that access to a plurality of base stations is maintained simultaneously, wherein the plurality of base stations belong to different wireless network operators; and
   reporting auxiliary information to the plurality of base stations, wherein the auxiliary information is configured to coordinate resources between the plurality of base stations;
   wherein, the auxiliary information comprises connection states of the multi-SIM terminal in a plurality of networks where the plurality of base stations are located;
   wherein reporting the auxiliary information to the plurality of base stations, comprises:
   determining that the connection state of the multi-SIM terminal in a network where a base station is located is a connected state in case that the multi-SIM terminal is in a connected state, an idle state or a non-active state in the network;
   determining that the connection state of the multi-SIM terminal in the network where the base station is located is a non-connected state in case that the multi-SIM terminal is in a state other than any of the connected state, the idle state and the non-active state in the network; and
   reporting the connection states of the multi-SIM terminal in the plurality of networks to each of the plurality of base stations.

2. The method of claim 1, wherein, the auxiliary information comprises discontinuous reception (DRX) configuration information of the multi-SIM terminal in a plurality of networks where the plurality of base stations are located, and the DRX configuration information comprises a starting sub-frame, a time offset, a cycle and an active duration.

3. The method of claim 2, wherein, the starting sub-frame is a sub-frame at the beginning of the DRX cycle which is mapped to a sub-frame of a network where a reported base station is located, and the time offset is a time offset between a frame edge of a network where another base station is located and a frame edge of a network where the reported base station is located.

4. The method of claim 1, wherein, the auxiliary information comprises semi-persistent schedule (SPS) configuration information of the multi-SIM terminal in a plurality of networks where the plurality of base stations are located, and the SPS configuration information comprises a starting sub-frame, a time offset, a cycle and a sending duration.

5. The method of claim 4, wherein, the starting sub-frame is a sub-frame at the beginning of the SPS cycle which is mapped to a sub-frame of a network where a reported base station is located, and the time offset is a time offset between a frame edge of a network where another base station is located and a frame edge of a network where the reported base station is located.

6. The method of claim 1, wherein, the auxiliary information is carried in one of the following:
   a radio resource control (RRC) connection setup complete message;
   an RRC connection setup resume message;
   an RRC connection reestablishment message; and
   a user equipment (UE) auxiliary information message.

7. The method of claim 1, further comprising:
   reporting updated auxiliary information in response to detecting that the auxiliary information is updated.

8. A method for coordinating resources, the method comprising:
   receiving, by a base station, auxiliary information reported by a multi-Subscriber Identity Module (SIM) terminal; and
   coordinating resources for the multi-SIM terminal and a plurality of base stations accessed by the multi-SIM terminal based on the auxiliary information;
   wherein, the auxiliary information comprises connection states of the multi-SIM terminal in a plurality of networks where the plurality of base stations are located; wherein the connection state of the multi-SIM terminal in a network where the base station is located is a connected state in case that the multi-SIM terminal is in a connected state, an idle state or a non-active state in the network, and the connection state of the multi-SIM terminal in the network where the base station is located is a non-connected state in case that the multi-SIM terminal is in a state other than any of the connected state, the idle state and the non-active state in the network.

9. The method of claim 8, wherein, in response to the auxiliary information comprises connection states of the multi-SIM terminal in a plurality of networks where the plurality of base stations are located, coordinating the resources for the multi-SIM terminal and the plurality of base stations accessed by the multi-SIM terminal based on the auxiliary information comprises one of the following:
   increasing a paging response duration and waiting for a paging response of the multi-SIM terminal based on the increased paging response duration in a network where another base station is located in response to the connection state of the multi-SIM terminal in the network is a connected state; and
   increasing a paging times and paging the multi-SIM terminal based on the increased paging times in a network where another base station is located in response to the connection state of the multi-SIM terminal in the network is a connected state.

10. The method of claim 8, wherein, in response to the auxiliary information comprises discontinuous reception (DRX) configuration information of the multi-SIM terminal in a plurality of networks where the plurality of base stations are located and the DRX configuration information comprises a starting sub-frame, a time offset, a cycle and an active duration, coordinating the resources for the multi-SIM terminal and the plurality of base stations accessed by the multi-SIM terminal based on the auxiliary information comprises:
   determining a time period for scheduling a downlink data receiving resource by each of other base stations in the plurality of base stations within each cycle based on the starting sub-frame, the active duration, and the time offset; and scheduling the downlink data receiving resource for the multi-SIM terminal within a time period other than the time period for scheduling the downlink data receiving resource by each of the other base stations.

11. The method of claim 8, wherein, in response to the auxiliary information comprises semi-persistent schedule (SPS) configuration information of the multi-SIM terminal in a plurality of networks where the plurality of base stations are located and the SPS configuration information comprises a starting sub-frame, a time offset, a cycle and a sending duration, coordinating the resources for the multi-SIM terminal and the plurality of base stations accessed by the multi-SIM terminal based on the auxiliary information comprises:

determining a time period for scheduling an uplink data sending resource by each of other base stations in the plurality of base stations within each cycle based on the starting sub-frame, the sending duration, and the time offset; and scheduling the uplink data sending resource for the multi-SIM terminal within a time period other than the time period for scheduling the uplink data sending resource by each of the other base stations.

12. A base station, comprising:
a processor; and
a memory configured to store instructions executable by the processor;
wherein, the processor is configured to perform the method for coordinating resources according to claim 8.

13. A multi-Subscriber Identity Module (SIM) terminal, comprising:
a processor; and
a memory configured to store instructions executable by the processor;
wherein, the processor is configured to:
determine that access to a plurality of base stations is maintained simultaneously, wherein the plurality of base stations belong to different wireless network operators; and
report auxiliary information to the plurality of base stations, wherein the auxiliary information is configured to coordinate resources between the plurality of base stations;
wherein, the auxiliary information comprises connection states of the multi-SIM terminal in a plurality of networks where the plurality of base stations are located;
wherein the processor is configured to report the auxiliary information to the plurality of base stations by:

determining that the connection state of the multi-SIM terminal in a network where a base station is located is a connected state in case that the multi-SIM terminal is in a connected state, an idle state or a non-active state in the network;

determining that the connection state of the multi-SIM terminal in the network where the base station is located is a non-connected state in case that the multi-SIM terminal is in a state other than any of the connected state, the idle state and the non-active state in the network; and reporting the connection states of the multi-SIM terminal in the plurality of networks to each of the plurality of base stations.

14. The multi-SIM terminal of claim 13, wherein, the auxiliary information comprises discontinuous reception (DRX) configuration information of the multi-SIM terminal in a plurality of networks where the plurality of base stations are located, and the DRX configuration information comprises a starting sub-frame, a time offset, a cycle and an active duration.

15. The multi-SIM terminal of claim 14, wherein, the starting sub-frame is a sub-frame at the beginning of the DRX cycle which is mapped to a sub-frame of a network where a reported base station is located, and the time offset is a time offset between a frame edge of a network where another base station is located and a frame edge of a network where the reported base station is located.

16. The multi-SIM terminal of claim 13, wherein, the auxiliary information comprises semi-persistent schedule (SPS) configuration information of the multi-SIM terminal in a plurality of networks where the plurality of base stations are located, and the SPS configuration information comprises a starting sub-frame, a time offset, a cycle and a sending duration.

17. The multi-SIM terminal of claim 16, wherein, the starting sub-frame is a sub-frame at the beginning of the SPS cycle which is mapped to a sub-frame of a network where a reported base station is located, and the time offset is a time offset between a frame edge of a network where another base station is located and a frame edge of a network where the reported base station is located.

18. The multi-SIM terminal of claim 13, wherein, the auxiliary information is carried in one of the following:
a radio resource control (RRC) connection setup complete message;
an RRC connection setup resume message;
an RRC connection reestablishment message; and
a user equipment (UE) auxiliary information message.

* * * * *